Oct. 14, 1958     J. B. BREAZEALE ET AL     2,856,240

MAGNETIC SUSPENSION CONTROL SYSTEM

Filed Nov. 4, 1955     2 Sheets-Sheet 1

INVENTORS
JOHN B. BREAZEALE
CHARLES G. McILWRAITH
EDWARD N. DACUS
BY
Frank H. Harmon
ATTORNEY INVENTORS
JOHN B. BREAZEALE
CHARLES G. McILWRAITH
BY EDWARD N. DACUS

ATTORNEY

United States Patent Office 2,856,240
Patented Oct. 14, 1958

2,856,240

MAGNETIC SUSPENSION CONTROL SYSTEM

John B. Breazeale, Solana Beach, and Charles G. McIlwraith and Edward N. Dacus, Rancho Santa Fe, Calif., assignors to Bill Jack Scientific Instrument Co., Solana Beach, Calif., a corporation of California Application November 4, 1955, Serial No. 544,954

9 Claims. (Cl. 308—10)

The present invention relates to magnetic apparatus for freely suspending a rotatable ferromagnetic body in space, which apparatus has control means for maintaining the rotatable body in a certain position with respect to the magnetic apparatus.

An important object of the present invention is to provide a new and improved magnetic apparatus for suspending a ferromagnetic body or spindle in free space or in a vacuum in which apparatus the ferromagnetic body is supported coaxially with first and second spaced electromagnets and in which control means is provided for detecting axial movement of the body and for maintaining the body centered between the electromagnets, the control means including axially spaced sensing coils connected in opposition to each other and positioned on opposite sides of a member carried by the suspended body and circuit means responsive to the output of the sensing coils to control the current flowing in the electromagnets.

Another object of the present invention is to provide an apparatus having a ferromagnetic body suspended between spaced coaxial magnets and in which detecting means senses movement of the body from a predetermined position toward either electromagnet and provides an alternating current signal having a phase at any given instant dependent upon the direction of displacement and an amplitude dependent upon the magnitude of the displacement and in which circuit means are provided for obtaining two direct current signals in response to the output signal from the detecting means which direct current signals have a relative polarity dependent upon the direction of displacement and a difference in magnitude which depends on the magnitude of the displacement of the body, the two direct current signals being utilized to control the current flowing in said electromagnets to maintain the ferromagnetic body in a centered position.

Another object of the present invention is to provide in an apparatus having a ferromagnetic body freely suspended between two coaxial electromagnets sensing coils for detecting axial movement of the body and exciting coils for the sensing coils magnetically coupled to the latter by a member carried by the body, the coils and member being so arranged that the output signal from the sensing coils has a polarity or phase dependent on the direction of displacement of the body.

Further objects and advantages will be apparent from the following detailed description of the preferred embodiment of the present invention made with reference to the accompanying drawings, in which.

Figure 1:
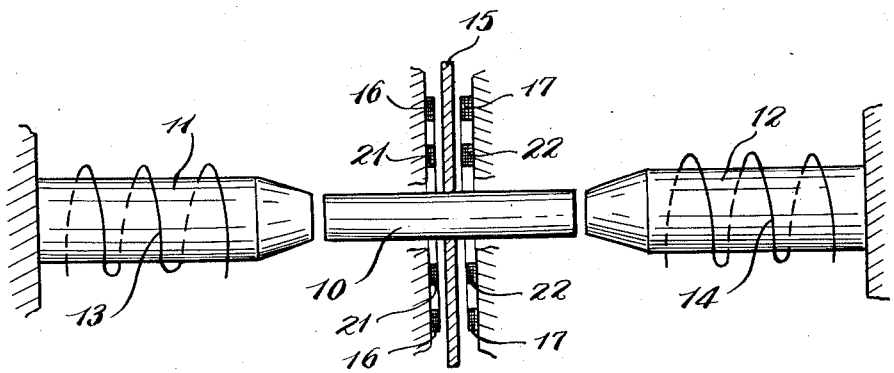
Figure 1 is a somewhat diagrammatic view of the magnets and the suspended body in an apparatus embodying the present invention.
Figure 2:
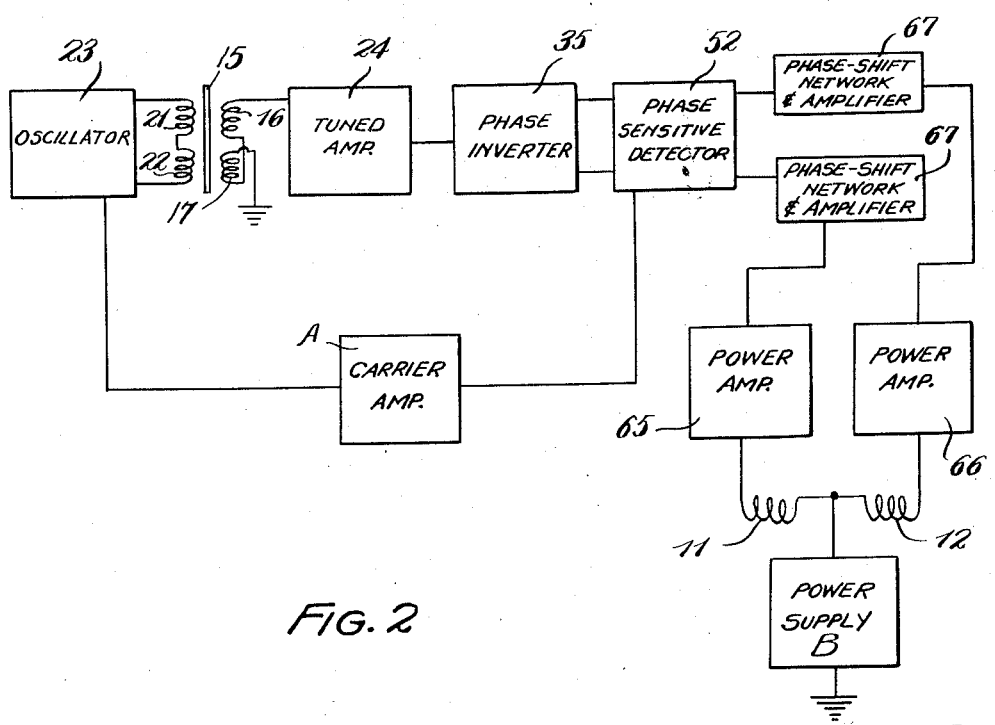
Figure 2 is a block diagram of the control circuit used with the apparatus of Figure 1.
Figure 3:
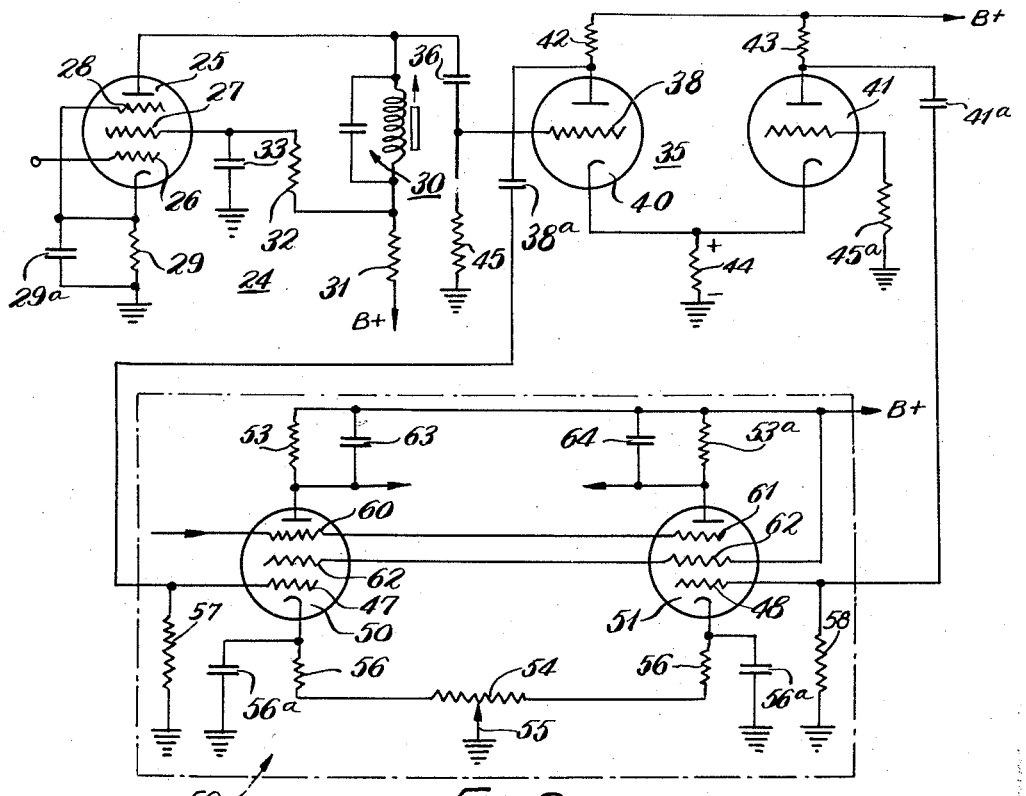
Figure 3 is a circuit diagram of a portion of the control circuit.

Referring to the drawings, a spindle 10 of ferromagnetic material is shown to be magnetically suspended midway between spaced electromagnets 11 and 12 which electromagnets include coils 13, 14 respectively for producing and controlling the magnetic flux of the electromagnets. The electromagnets 11 and 12 and the spindle 10 are positioned coaxially with each other and the spindle 10 is free of physical contact with both electromagnets when suspended by the flux of the magnets. The spindle 10 has a transversely extending disc 15 fixed thereto, preferably, although not necessarily, at the mid point of its length and preferably of a non-magnetic material such as aluminum for use in detecting axial movement of the spindle from its centered position between the electromagnets.

Sensing coils 16 and 17 for determining axial movement of the spindle, are stationarily supported on opposite sides of the disc 15 coaxially with the spindle and are excited by exciting coils 21 and 22. The exciting coils 21, 22 are positioned coaxially within the sensing coils 16, 17, respectively, and are connected in series with each other and with the output of a radio frequency oscillator 23.

The exciting coils 21, 22 are coupled to their respective sensing coils by the disc 15 on the spindle 10 and the voltages induced in the sensing coils will depend upon the relative position of the disc to the sensing coils and the exciting coils, the voltage in each sensing coil decreasing as the disc moves closer to the sensing coil and its exciting coil.

The sensing coils 16 and 17 are connected in series with each other and with the input of a tuned amplifier 24. The series connections of the coils 16 and 17 are such that the voltages created in the coils oppose or buck each other. In the illustrated embodiment, if the disc 15 is centered between the sensing coils 16 and 17 the voltages in the coils will be equal and opposite and the output from the sensing coils to the tuned amplifier will be zero. If, however, the disc is displaced from its center position, the voltage in one of the coils will decrease and the other increase and an error signal is produced. If the displacement is toward one sensing coil the error signal applied to the amplifier is of one phase or polarity at a given instant, and if toward the other coil, is of the directly opposite phase or polarity. In either case the amplitude of the oscillations of the error signal is dependent upon the magnitude of the deflection of the disc 15 from its center position between the sensing coils 16 and 17.

In the illustrated embodiment, the tuned amplifier 24 comprises a pentode tube 25 having a control grid 26, screen grid 27, and suppressor grid 28, the error signal from the sensing coils being applied to the control grid 26. The cathode of the tube 25 is connected to ground through a resistor 29 and condenser 29a connected in parallel and the plate of tube 25 is connected to B-plus, the positive terminal of a direct current power supply B having its negative terminal grounded, through a parallel LC tank circuit 30 and a plate resistor 31. Operating potential for screen grid 27 is supplied via dropping resistor 32 which is connected to the junction of resistor 31 and tank 30. A screen bypass resistor 33 is connected to ground.

The output of the tuned amplifier 24 is coupled to the input of a phase inverter 35 by a condenser 36 having one side connected to the plate of tube 25 and the other side to the grid 38 of a triode 40 of the phase inverter 35.

The phase inverter 35 in effect divides the error signal into two signals which are of equal amplitude but are 180 degrees out of phase with each other. In addition to the triode 40, the phase inverter comprises a second triode 41. The plates of the triodes 40 and 41 are respectively connected to the B-plus terminal of the grounded power supply by plate resistors 42, 43 and the cathodes of the triodes 40, 41 are connected to ground through a common resistor 44. The grids of the triodes 40, 41 are connected to ground by grid leak resistors 45 and 45a respectively.

The outputs from the phase inverter 35 are taken respectively from the plate connections of the triodes 40 and 41. As the signal on the grid of triode 40 drives the plate of the triode more positive, the plate of the triode 41 will be driven more negative and vice versa, and therefore the outputs of the triodes will be 180 degrees out of phase with each other. It will be noted that one of the outputs will be in phase with the output of the oscillator 23 and the other out of phase. Since the phase of the input to the phase inverter 35 depends on the direction of deflection of the spindle from its center position, which output signal of the phase inverter is in phase with the oscillator output also depends upon the direction of deflection of the spindle.

The output signals from the phase inverter are respectively coupled to control grids 47, 48 of pentodes 50, 51 of a phase sensitive detector 52 through condensers 38a and 41a. The plates of the pentodes 50 and 51 are connected to B-plus by plate resistors 53 and 53a respectively and the cathode of the pentodes 50 and 51 are connected together by a balancing resistor or potentiometer 54 having a slidable tap 55, which tap is connected to ground. Each of the connections from the resistor 54 to the cathodes includes a resistor 56 and a radio frequency by-pass condenser 56a is connected between each cathode and ground.

In addition to the grids 47 and 48 mentioned above, the pentodes 50 and 51 include suppressor grids 60 and 61 respectively. The output of the oscillator 23 is connected to the grids 60, 61 of the pentodes 50, 51 through an amplifier A to provide a carrier or reference switching wave for demodulating the error signals. The screen grids 62 of the pentodes are connected to B-plus. The reference wave applied to the suppressor grids with no signal on the control grids 47 and 48 respectively biases the pentodes 50 and 51 to cut-off for negative excursions of the carrier wave and causes conduction on positive excursions of the carrier wave. Bias for control grid 47 is developed across a network comprising the left-hand cathode resistor 56, the left-hand portion of resistor 54, and resistor 57. In a similar manner, the grid bias for control grid 48 is derived over a path made up of the right-hand cathode resistor 56, the right-hand portion of resistor 54, and resistor 58. Tap 55 is of utility in balancing the output currents of the pentodes 50, 51 for a zero error signal input condition.

It can therefore be seen that when an input signal is applied to the grid 47 which is in phase with the carrier wave on suppressor grid 60, the pentode will conduct increased current on positive excursions of the carrier wave since the effect of the signal will be additive. If, however, the signal on grid 47 is 180 degrees out of phase with the carrier wave, the effect will be subtractive and the output of the pentode 50 will diminish. Normally the signal on grid 47 will not override the carrier wave. The pentode 51 operates in a manner similar to pentode 50 and since the two signals applied to the grids 47, 48 of the pentodes are always 180 degrees out of phase, when the output of one pentode increases the other decreases.

The output signals from the detector 52 are taken from the plate end of resistors 53 and 53a respectively. Because of the switching action of the carrier wave, the polarity of the output is unidirectional. Condensers 63 and 64, connected in parallel with the resistors 53 and 53a respectively, charge when current flows in the plate circuit and discharge when the plate current diminishes or cuts off due to the action of the carrier wave. Thus it can be seen that the direct current signals from the phase detector will be varying unidirectional signals.

The varying direct current outputs of the phase detector are used to control the power supplied to the electromagnets 11 and 12 from respective power amplifiers 65, 66. Each output signal from the detector is preferably connected to the input of its respective power amplifier through a phase shifting network 67 and a direct current amplifier 68. The phase shifting networks prevent oscillation of the spindle which might otherwise occur and each network comprises a triode 70 having a grid 71 to which the signal from the detector is applied and series connected cathode resistors 72 and 73 in the cathode circuit of triode 70. The cathode resistor 72 of each network has one side connected to the cathode of triode 70 and the resistor 73 of each network has one side connected to the cathode of a triode 76 of the corresponding direct current amplifier 68 through a cathode resistor 77. The cathode resistor 72 of each network has a condenser 78 connected in parallel therewith and the common connection between resistors 72 and 73 of each network is connected to the grid of the triode 76 of the corresponding amplifier 68. The condenser 78 and resistors 72 and 73 of each network determine the amount of phase shift and the frequency at which it occurs.

The plate of triode 70 of each network is connected to B-plus and the plate of the corresponding triode 76 is also connected to B-plus through series connected resistors 80 and 81 with the common connection between resistors 80 and 81 being connected to ground through a gas constant voltage tube CV thereby maintaining a constant voltage drop across the resistor 81. The common connection between the resistors 73 and 77 in the cathode circuits of triodes 70 and 76 of each network is maintained negative with respect to ground.

Figure 4:
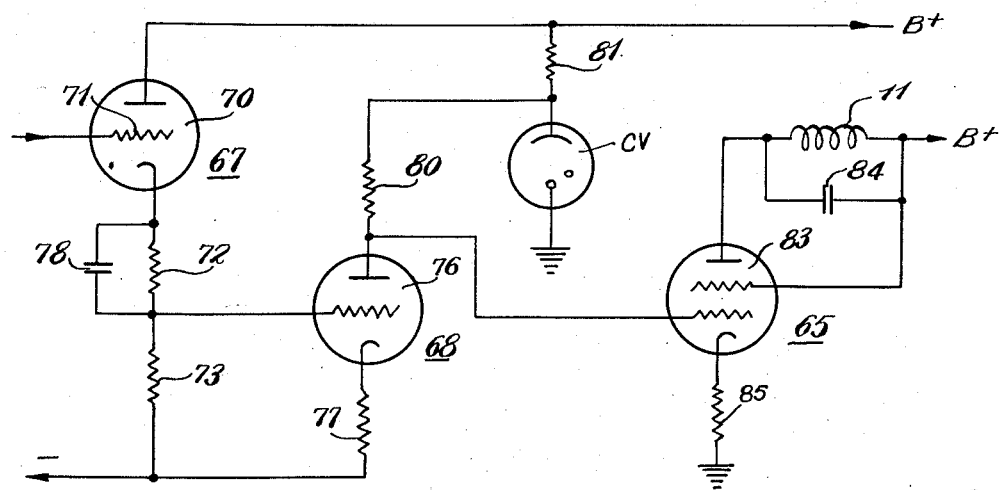
Figure 4 is a circuit diagram of another portion of the control circuit.

The output signals from the phase shifting networks and direct current amplifiers are taken from the plate connections of triodes 76 of the respective networks and are respectively applied to the grids of tetrodes 83 of the power amplifiers 65, 66 respectively. It will be assumed that the power amplifier shown in Figure 4 is amplifier 65, it being understood that amplifier 66 is identical thereto. The output circuit of the tetrode 83 of amplifier 65 includes the coil of electromagnet 11, one side of the coil being connected to the plate of the tetrode 83 of the power supply and the other side to B-plus. The cathode of the tube 83 of amplifier 65 is connected to ground through a cathode resistor 85. A condenser 84 is preferably connected in parallel with the coil 11.

Since one of the signals to the power amplifiers decreases when the other increases, when the current in one of the electromagnets increases in response to an error signal from the sensing coils the current in the other decreases. The connections are such that as the spindle is deflected toward one of the electromagnets to increase the voltage in one of the sensing coils, the control mechanism will cause a decrease in the current flowing through the electromagnet toward which the spindle is deflected and increase the current in the other electromagnet to return the spindle to its center position. The spindle will be maintained in its center or neutral position in free space or in a vacuum regardless of the attitude or position of the apparatus.

The operation of the control circuit may be summarized as follows. The output of the radio frequency oscillator 23 is fed to the pair of exciting coils 21 and 22, one placed on each side of the disc and each coaxial with the magnets and the spindle. These coils induce a voltage in the sensing coils 16 and 17. The magnitude of the induced voltage depends on the coupling between the particular exciting coil and the corresponding sensing coil, and this in turn depends on the distance of the disc from the coils. The two sensing coils 16 and 17 are series connected in opposition so that when the disc is halfway between the two coils the induced voltages cancel and no signal is supplied to the tuned amplifier 24. When the spindle and disc move to either side of the center position the two induced voltages no longer completely cancel and a signal with amplitude roughly proportional to deviation from the center position is fed to the tuned amplifier. The phase or polarity of this signal depends on which direction the disc has moved from the center position, and changes by 180 degrees as the disc moves through the center position. Thus the amplitude of the signal tells how far the disc and spindle are from the center position, and the phase tells on which side of center they are.

This "error" signal is amplified by the tuned amplifier 24 and then split by the phase inverter 35 into two signals of equal amplitude, but differing in phase by 180 degrees. These two signals along with a reference wave from the oscillator 23 are fed into a phase sensitive detector 52, one of the error signals being in phase with the wave from the oscillator and the other out of phase. This device produces two direct current outputs. The voltage difference between these two outputs is proportional to the amplitude of the signals coming from the phase inverter, and the relative polarity of the two output signals depends on which of the two signals from the phase inverter is in phase with the signal from the oscillator 23. Thus, as the disc moves from the center position, one of the direct current levels rises and the other falls. If the disc is moved in the opposite direction the direct current levels also change in the opposite direction. These two direct current voltages are applied to phase shift networks 67 whose function is to provide phase shifts which damp out the axial oscillations of the spindle which would otherwise occur. The direct current signals are then amplified and applied to the control grids of the two power amplifiers 65 and 66. Each of the amplifiers 65 and 66 control the current through one of the electromagnets, and since the direct current error signals move in opposite directions when the disc and spindle are moved the current in one magnet is increased and the current in the other magnet is decreased, tending to return the spindle to the center position.

It can now be seen that the present invention provides a new and improved apparatus for magnetically suspending a ferro-magnetic body in any attitude in free space which will accurately maintain the body in a centered position between two suspending electromagnets.

While the preferred form of the present invention has been described in considerable detail, it is hereby our intention to cover all other constructions, modifications and arrangements which fall within the practice of those skilled in the art to which the invention relates and the scope of the appended claims.

What we claim is:

1. In an apparatus comprising spaced coaxial electromagnets and a body of ferromagnetic material suspended therebetween, the improvement of a member carried by said body and extending transversely of the axes of said electromagnets, first and second sensing coils adjacent to said member and respectively on opposite sides thereof, first and second exciting coils for inducing a voltage in said first and second sensing coils respectively, said exciting coils being positioned adjacent to said member on opposite sides thereof and the coupling between said exciting coils and their respective sensing coils depending upon the relative position of said member and said sensing coils, circuit means responsive to the change in voltages in said sensing coils due to displacement of said member upon movement of said body from a predetermined position between said electromagnets to decrease the current flowing through the electromagnet toward which said member is displaced and increase the current in the other electromagnet.

2. In an apparatus comprising first and second spaced coaxial electromagnets, means for energizing said electromagnets, and a body magnetically suspended in free space by and between the electromagnets, the combination of first and second spaced sensing coils between said electromagnets and coaxial therewith, first and second exciting coils coaxial and coplanar with said first and second sensing coils respectively for inducing a voltage in said first and second coils respectively, a member carried by said body and positioned between said first and second sensing coils and varying the coupling between said sensing coils and the respective exciting coils upon movement of said member, an oscillator for energizing said exciting coils to induce certain voltages in said sensing coils when said body is in a predetermined position between said sensing coils, and circuit means responsive to the changes in the voltages in said sensing coils upon displacement of said body and member from said predetermined positions toward either of said electromagnets to decrease the current in the electromagnet toward which the member is displaced and increase the current in the other electromagnet.

3. An apparatus comprising a ferromagnetic body, first and second spaced coaxial electromagnets respectively supported at the opposite ends of said body for magnetically suspending said body in free space, a member carried by said body, detecting means for sensing displacements of said body carried member toward either of said electromagnets from a predetermined position therebetween and for providing upon the occurrence of such a displacement, an alternating current output signal whose amplitude depends upon the magnitude of the displacement and which is of one polarity at a given instant if the deflection is toward one electromagnet and of the opposite polarity if toward the other electromagnet, means responsive to said output signal for producing first and second alternating current signals of opposite phase and each having an amplitude dependent upon the amplitude of said output signal and a polarity at any given instant dependent upon the polarity of said output signal, means responsive to said first and second signals for providing first and second unidirectional current signals having a relative polarity dependent on the direction of displacement of said body and means responsive to the last said signals for decreasing the current in the electromagnet toward which the displacement occurs and increasing the current in the other electromagnet.

4. An apparatus comprising a ferromagnetic body, first and second spaced coaxial electromagnets respectively supported at the opposite ends of said body for magnetically suspending said body in free space, a member carried by said body, detecting means for sensing displacements of said body carried member toward either of said electromagnets from a predetermined position therebetween and for providing upon the occurrence of such a displacement, a radio frequency output signal whose amplitude depends upon the magnitude of the displacement and which is of one polarity at a given instant if the deflection is toward one electromagnet and of the opposite polarity if toward the other electromagnet, means responsive to said output signal for producing first and second alternating current signals of opposite phase and each having an amplitude dependent upon the amplitude of said output signal and a polarity at any given instant dependent upon the polarity of said output signal, means responsive to said first and second signals for providing first and second unidirectional current signals having a relative polarity dependent on the direction of displacement of said body and means responsive to the last said signals for decreasing the current in the electromagnet toward which the displacement occurs and increasing the current in the other electromagnet.

5. An apparatus comprising a ferromagnetic body, first and second spaced coaxial electromagnets respectively supported at the opposite ends of said body for magnetically suspending said body in free space, a disc carried by said body, detecting means for sensing displacements of said body carried disc toward either of said electromagnets from a predetermined position therebetween and for providing upon the occurrence of such a displacement, an alternating current output signal whose amplitude depends upon the magnitude of the displacement and which is of one polarity at a given instant if the deflection is toward one electromagnet and of the opposite polarity if toward the other electromagnet, means responsive to said output signal for producing first and second alternating current signals of opposite phase and each having an amplitude dependent upon the amplitude of said output signal and a polarity at any given instant dependent upon the polarity of said output signal, means responsive to said first and second signals for providing first and second unidirectional current signals having a relative polarity dependent on the direction of displacement of said body and means responsive to the last said signals for decreasing the current in the electromagnet toward which the displacement occurs and increasing the current in the other electromagnet, the last said means including phase shifting means responsive to variations in the direct current signals.

6. An apparatus comprising a ferromagnetic body, first and second spaced coaxial electromagnets respectively supported at the opposite ends of said body for magnetically suspending said body in free space, detecting means for sensing displacements of said body toward either of said electromagnets from a predetermined position therebetween and for providing upon the occurrence of such a displacement, an alternating current output signal whose amplitude depends upon the magnitude of the displacement and which is of one polarity at a given instant if the deflection is toward one electromagnet and of the opposite polarity if toward the other electromagnet, said detecting means comprising first and second spaced sensing coils about said body, first and second exciting coils about said body for inducing voltages in said first and second sensing coils respectively, a coupling member fixed to said body and between said coils for controlling the magnetic coupling between said sensing coils and their respective exciting coils, and circuit means for connecting said sensing coils in bucking relationship to provide an output signal dependent on the difference of the voltages induced therein, means responsive to said output signal for producing first and second alternating current signals of opposite phase and each having an amplitude dependent upon the amplitude of said output signal and a polarity at any given instant dependent upon the polarity of said output signal, means responsive to said first and second signals for providing first and second unidirectional current signals having a relative polarity dependent on the direction of displacement of said body and means responsive to the last said signals for decreasing the current in the electromagnet toward which the displacement occurs and increasing the current in the other electromagnet.

7. An apparatus comprising a ferromagnetic body, first and second spaced coaxial electromagnets respectively at opposite ends of said body for magnetically suspending said body in free space, a member carried by said body, electrical oscillator means for providing an electrical wave, detecting means excited by said oscillator means for sensing displacement of said body carried member from a predetermined position toward either one of said electromagnets and for providing an alternating current output signal having an amplitude dependent upon the magnitude of the displacement and a polarity at any given instant dependent upon the direction of displacement from said predetermined position, means responsive to said signal to provide a first alternating signal having a first phase relationship with respect to said wave if the displacement is in one direction and a second phase relationship with respect to said wave if in the other direction, and a second signal having a phase relationship with respect to said wave when said first signal has said first phase relationship and another phase relationship with respect to said wave when said first signal is of said second phase relationship with respect to said wave, the amplitude of said signals being dependent upon the magnitude of the displacement, and phase sensitive means for comparing said first and second signals and said wave and for providing first and second direct current signals whose relative polarity is dependent upon the direction of displacement and whose difference in magnitude is proportional to the magnitude of the displacement of the body.

8. In an apparatus having a pair of spaced coaxial electromagnets, means for energizing said electromagnets, and a body magnetically suspended by said electromagnets in free space therebetween, the combination of control means for maintaining said body in a predetermined position between said electromagnets comprising first and second spaced sensing coils adjacent to said body, first and second exciting coils coupled to said first and second sensing coils respectively for inducing voltages therein, an oscillator means for energizing said exciting coils and for providing a carrier wave, a member carried by the body and positioned between said sensing coils for varying the coupling between said exciting coils and said sensing coils on movement of the member, said first and second sensing coils being connected in series in bucking relationship and the voltages induced therein when said body is in said predetermined position being of equal magnitude, phase inverting means responsive to an unbalance of said sensing coils to produce a first alternating current signal in phase with said carrier wave when the unbalance is in one direction and 180 degrees out of phase when in the other direction and a second signal 180 degrees out of phase with said carrier wave when the unbalance is in said one direction and in phase when the unbalance is in said other direction, phase responsive means for comparing the phase of said carrier wave and said first and second signals and for providing first and second unidirectional signals whose magnitudes are increased in accordance with the magnitude of the respective output signals from said phase inverting means when the signals are of one phase with respect to said carrier wave and decreased in accordance with the magnitude of said output signals when the latter are of the other phase with respect to said carrier wave, and means responsive to said signals to decrease the current in electromagnet toward which said member is displaced and increase the current in the other of said electromagnets.

9. In a magnetic suspension device for suspending objects in free space or in a vacuum in any attitude, a ferromagnetic material body constituting an object to be supported, a pair of spaced electromagnets coaxially disposed on opposite sides of and spaced from said body, each electromagnet including an energizing coil, means to energize said electromagnets through said coils, means in circuit with said coils to control the energization of said electromagnets to magnetically suspend said body in space in a neutral position between said electromagnets, said electromagnets constituting the sole supporting means for said body, and sensing means to detect axial movements of said body from its neutral position, due to axial components of external forces acting on the body, and to cause said control means to oppositely vary the magnetic force of each said electromagnet on the body by differentially varying the energization thereof to oppose the external force components to maintain the body in its neutral position.

References Cited in the file of this patent
UNITED STATES PATENTS

| | | |
|---|---|---|
| 1,589,039 | Anschutz-Kaempfe | June 15, 1926 |
| 2,568,587 | Macgeorge | Sept. 18, 1951 |
| 2,597,899 | Payne | May 27, 1952 |
| 2,602,660 | Shannon | July 8, 1952 |
| 2,695,165 | Hansen | Nov. 23, 1954 |

OTHER REFERENCES

"Mechanical Measurements by Electrical Methods" a book by Howard C. Roberts, The Instruments Publishing Co., Inc., Pittsburgh, 1951, pp. 44–54.